(12) United States Patent
Odhner et al.

(10) Patent No.: US 7,403,886 B2
(45) Date of Patent: *Jul. 22, 2008

(54) LOAD STIMULATION TOOL FOR SERVER RESOURCE CAPACITY PLANNING

(75) Inventors: Matthew C. Odhner, Woodinville, WA (US); Giedrius Zizys, Redmond, WA (US); Kent Schliiter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

This patent is subject to a terminal disclaimer.

(21) Appl. No.: 10/999,308

(22) Filed: Nov. 30, 2004

(65) Prior Publication Data

US 2005/0102318 A1    May 12, 2005

Related U.S. Application Data

(63) Continuation of application No. 09/577,118, filed on May 23, 2000, now Pat. No. 6,898,564.

(51) Int. Cl.
- G06F 13/10 (2006.01)
- G06F 13/12 (2006.01)
- G06F 9/44 (2006.01)
- G06F 17/10 (2006.01)
- G06F 7/60 (2006.01)

(52) U.S. Cl. ............................. 703/21; 703/2; 709/203; 709/220; 709/226

(58) Field of Classification Search ............... 703/2, 703/21; 709/203, 220, 226, 224, 221, 202; 714/47, 37; 702/182

See application file for complete search history.

(56) References Cited

U.S. PATENT DOCUMENTS

| 5,668,995 | A | | 9/1997 | Bhat |
|---|---|---|---|---|
| 5,761,091 | A | | 6/1998 | Agrawal et al. |
| 5,838,919 | A | | 11/1998 | Schwaller et al. |
| 5,943,244 | A | * | 8/1999 | Crawford et al. ............... 703/13 |
| 5,974,572 | A | * | 10/1999 | Weinberg et al. .............. 714/47 |
| 6,086,618 | A | | 7/2000 | Al-Hilali et al. |
| 6,108,800 | A | | 8/2000 | Asawa |
| 6,209,033 | B1 | | 3/2001 | Datta et al. |
| 6,301,615 | B1 | | 10/2001 | Kutcher |
| 6,317,778 | B1 | | 11/2001 | Dias et al. |
| 6,542,854 | B2 | | 4/2003 | Yang |
| 6,574,587 | B2 | | 6/2003 | Waclawski |
| 6,898,564 | B1 | * | 5/2005 | Odhner et al. ................. 703/21 |

OTHER PUBLICATIONS

Vekiarides et al., "NETCAP: A tool for the Capacity Planning of Ethernet LANS" Model Analysis and Simulation of Compter and Telecommunication Systems 1998 Proceedings Sixth.

* cited by examiner

Primary Examiner—Paul L Rodriguez
Assistant Examiner—Dwin M Craig
(74) Attorney, Agent, or Firm—Lee & Hayes, PLLC

(57) ABSTRACT

A methods and systems for capacity planning of server resources are described wherein a load simulation tool is used to use actual data gathered from a server cluster during operation to simulate server cluster operation in which the load (requests per second) can be increased, and the effects on the utilization of resources can be observed. Plans containing recommendations are then presented to a system user so the user can make decisions necessary regarding whether to change configuration hardware to meet expected load increases in the future.

37 Claims, 4 Drawing Sheets

APPCENTER CAPACITY PLANNING WORKSHEET

CALIBRATION ANALYSIS

MACHINE INFORMATION

CONFIGURE CALIBRATION

CALIBRATION SCRIPT: PG MIX 1

RUN NOW

CONFIGURE CALIBRATION TEST

SERVER NAME: WEB02
MASTER TEST CLIENT NAME: CL01T
TEST SCRIPT: SCRIPT022A

CALCULATE PROJECTED CAPACITY

REQUESTS PER SECOND: 37
NUMBER OF SERVERS: 8
AVAILABLE BANDWIDTH: T1 (1.54 Mb/Sec)

HELP

WORKSHEET RESULTS

CALIBRATED DATA
- GEN. 77%
- PROC. 40%
- B/W 98%
- MEM. 64%

RECOMMENDATIONS

STATUS: CALIBRATION RUNNING....

<<PREVIOUS    NEXT >>

CALIBRATION RESULTS

LOAD STIMULATION TOOL FOR SERVER RESOURCE CAPACITY PLANNING

RELATED APPLICATIONS

This application is a continuation of U.S. patent application Ser. No. 09/577,118, filed on May 23, 2000 now U.S. Pat. No. 6,898,564, entitled "Load Simulation Tool For Server a Resource Capacity Planning" and naming Matt Odhner, Giedrius Zizys and Kent Schiiter as inventors, the disclosure of which is hereby incorporated herein by reference. This application is also related to U.S. patent application Ser. No. 10/999,551, filed on an even date herewith, which is also a continuation of U.S. patent application Ser. No. 09/577,118.

TECHNICAL FIELD

This invention relates to server systems, and more particularly to systems and methods for server resource capacity planning in server systems.

BACKGROUND

Capacity planning is forward-looking resource management that allows a computer system administrator to plan for expected changes of system resource utilization and make changes to the system to adequately handle such changes. Server performance and capacity planning is a top concern of computer administrators and business managers. If a lack of proactive and continuous capacity planning procedure leads to unexpected unavailability and performance problems, the downtime that results can be financially devastating to a company that depends heavily on server performance, such as an Internet-based merchant.

The importance of superior capacity planning is heightened by the continuous growth in server-dependent companies and potential customers for such companies. Even a solid company that has millions of customers can quickly decline in popularity if it does not increase its resources to handle a constant increase in customers. Excessive downtime of such a company can cause customers to take their business elsewhere.

Capacity planning requires both scientific and intuitive knowledge of a server system. It requires in-depth knowledge of the resource being provided and an adequate understanding of future server traffic. The difficulty of the problem has increased by technology in which multiple servers, or server clusters, are employed to handle a network or an Internet website.

Current capacity planning methods do not adequately estimate a number of servers having certain resources that a system will need to handle expected loads (requests per second). Therefore, a capacity planning method and system is needed in which a user can provide an expected load that the system needs to handle and receive information on how to increase servers and/or resources to adequately handle that load.

SUMMARY

A method and system for providing capacity planning of server resources is described herein. The methods and systems contemplate using measured data, extrapolation, and a load simulation tool to provide capacity planning results that are more accurate than current schemes. The load simulation tool and its implementation are also described. Server resources for which utilization is calculated are processor utilization, communication bandwidth utilization, memory utilization, and general server utilization.

Utilization is expressed in terms of actual use of the resource in relation to the total amount of resource available for use. For example, processor utilization is expressed as a percentage of procession power utilized for a given load in relation to the total processing power available. Communication bandwidth utilization is expressed as a percentage of an average server throughput per bytes per second in relation to the total communication bandwidth available. Memory utilization is expressed as a percentage of memory required per request times the length of a request queue in relation to the total memory available. General server utilization is expressed as a ratio between a current service rate (number of requests per second served) and the maximum possible service rate (maximum number of requests the server is capable of serving). This is less specific than showing the processor, bandwidth, and memory utilization, but it is useful for viewing resource constraints that do not fall under the other three categories.

The calculations that are used to derive utilization percentages of server resources require that the maximum load that can be handled by the server cluster (maximum requests/second) be determined. Other methods to estimate this maximum load are described in a related patent application entitled, "Capacity Planning For Server Resources," by Odhner et al., U.S. patent application Ser. No. 09/577,118, filed on Apr. 14, 2000. It is noted that the inventors of the referenced patent application are the same of those of the present application, and that Microsoft Corp. is the assignee of both disclosures.

The implementation described herein derives the maximum load of a server cluster by collecting actual server parameter values during operation of the server system. This is accomplished through the use of a filter, such as an Internet Server Application Program Interface (ISAPI) filter, that collects actual server traffic information as data is transmitted to and from the server cluster. In addition, a monitor on each server in the server cluster collects other server parameter values that are used in subsequent calculations.

After the filter and the monitors have collected the required data, a system user selects a client computer from which to run a load simulation tool. The load simulation tool, in effect, replays the data that has been collected from the server cluster, such as the actual requests made to the server, the time intervals at which requests were made, etc. The load simulation tool is then used to increase the load on the system until a maximum service rate that the system can support is found.

There are several ways to calibrate the server load to find the maximum service rate. The number of users from the actual recorded data can be multiplied. to simulate a greater number of users, which will increase the load on the system. Another way is to decrease the amount of time between requests, as recorded by the system, which will increase the load on the system. As the load increases, a service rate is monitored. When a further increase in the load does not increase the service rate, the load on the system at that point is considered to be the maximum service rate that can be delivered by the server.

It is noted that the user can create a script manually, instead of replaying the recorded data to calibrate the maximum load, but this will not provide a similarly accurate outcome, since the user in that situation, is required to estimate certain server usage parameters.

After the system is calibrated to find the maximum load that can be handled by the system, the maximum load value is used in subsequent calculations to determine server resource utilization estimates for any number of hypothetical situations. For instance, a user can enter information regarding a particular load that the user wants the current system to handle. The described implementation provides that user with estimates as to the utilization that the specified load will cause for the processor, the memory, the communications bandwidth, and the server in general. Also, the user may want to see how adding or removing a server from a current system will affect the utilization of these server resources. This situation can be adequately determined using the implementation described herein.

Finally, after the user runs the load simulation tool to calibrate the system as to the maximum load and make determinations regarding utilization of server resources, the system provides a plan that recommends any changes in configuration, if any, that should be made to the system to optimize system performance. These recommendations are stored for each test result, thereby enabling the user to run several tests, and contrast and compare results and recommendations for different situations that the user may expect in the future. The user is thus enabled to adequately plan for future situations.

BRIEF DESCRIPTION OF THE DRAWINGS

A more complete understanding of the various methods and arrangements of the present invention may be had by reference to the following detailed description when taken in conjunction with the accompanying drawings, wherein:

FIG. 3 is a screen shot of a capacity planning worksheet utilized in a capacity planning process using a stress simulation tool.

DETAILED DESCRIPTION

Figure 1:
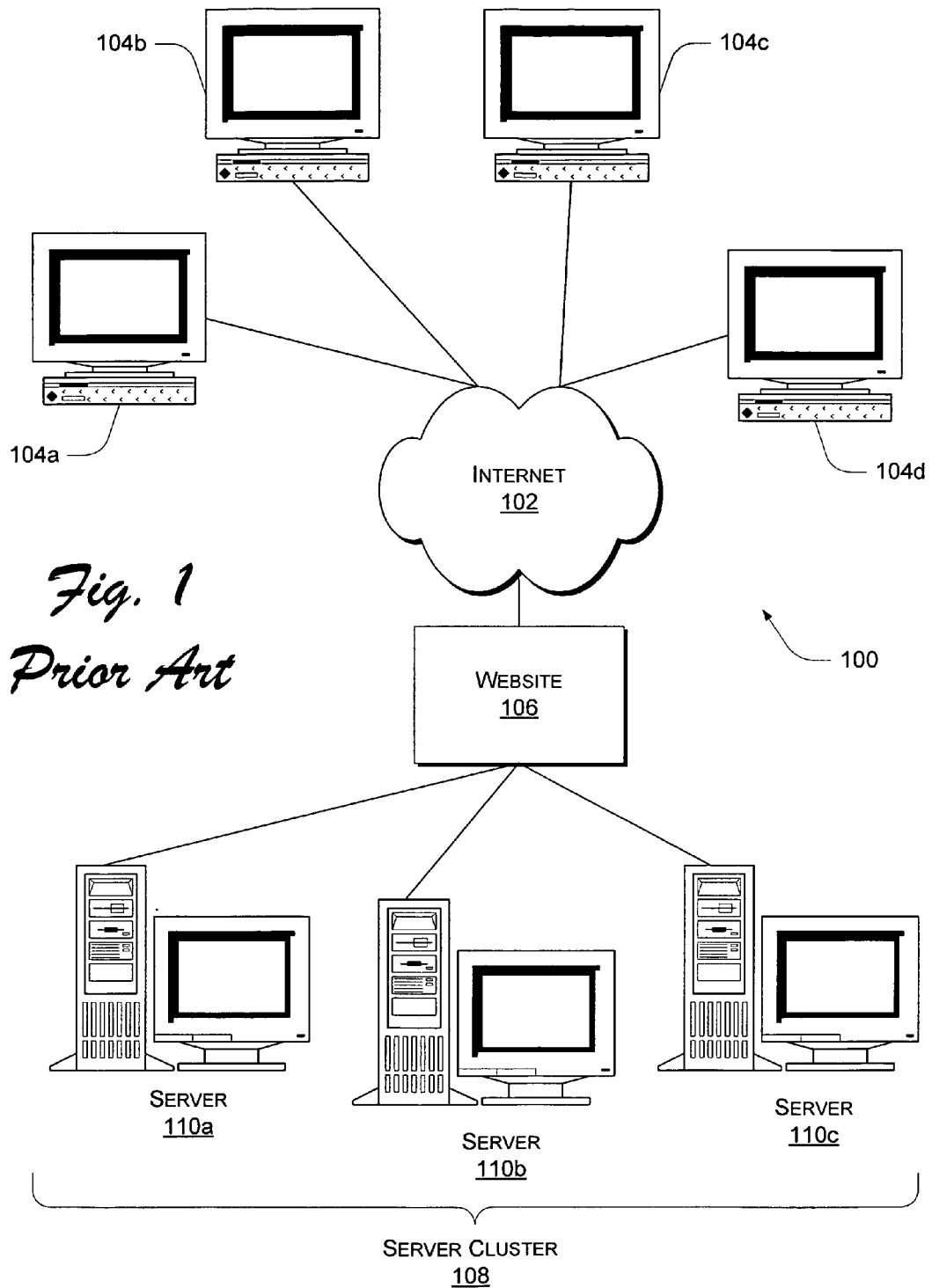
FIG. 1 is an illustration of a prior art server-client system having a server cluster that supports a website on the Internet.

FIG. 1 shows a typical Internet-based server-client system 100. The system 100 includes several clients 104a, 104b, 104c, 104d connected to the Internet 102. A website 106 runs on a server cluster 108 comprised of three servers 110a, 11b, 110c. Although the server-client system 100 is shown operating within an Internet website context, it is noted that the server-client system may operate in any server-client network context, such as a local area network (LAN) or a wide area network (WAN).

Figure 2:
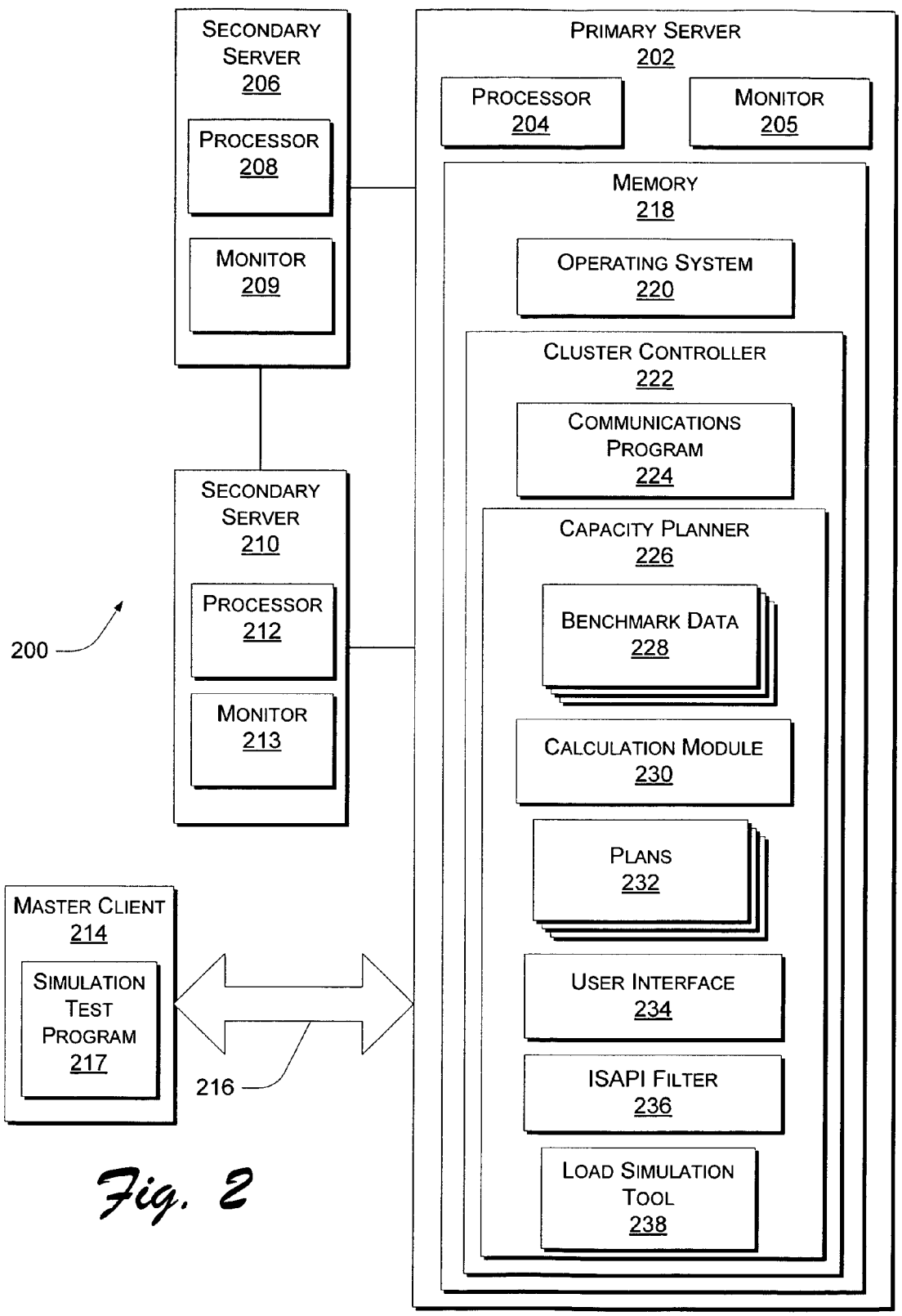
FIG. 2 is a high-level block diagram of a server cluster having a stress simulation tool for capacity planning.

FIG. 2 depicts a server cluster 200 in accordance with the described implementations. The server cluster 200 comprises a primary server 202 having a processor 204 and a monitor 205, a first secondary server 206 having a processor 208 and a monitor 209, and a second secondary processor 210 having a processor 212 and a monitor 213. The monitors are software devices that collect server parameter values while the server cluster 200 is in operation. The server cluster 200 communicates with a master client 214 via a communications connection 216. It is noted that several clients (not shown may be connected to the server cluster 200. However, only one client is selected by the user to be the master client 214. The master client 214 includes a simulation test program 217. The function of the master client 214 and the simulation test program 217 will be discussed in greater detail below.

The primary server 202 also includes a memory 218 and runs an operating system 220. The operating system 220 provides resource management for primary server 202 resources. The memory 218 of the primary server 202 includes a cluster controller 222, which controls communications between the primary server 202 and the secondary servers 206, 210 and between the server cluster 200 and the network 214. To accomplish this, the cluster controller 222 is provided with a communications program 224.

A capacity planner 226 is included in the cluster controller 222. The function of the capacity planner 226 and its components will be described in greater detail below. Generally, the capacity planner 226 comprises benchmark data 228 in which data collected from the server cluster 200 is stored, a calculation module 230 which stores the equations necessary to derive server resource utilization estimates, and plans 232 which stores recommendations that may be made to improve operational configuration of the server cluster. This file of recommendations is pre-defined by the manufacturer to list all the possible recommendations developed for the server cluster 200. In addition, plans 232 may be updated via a version upgrade or through a connection to the Internet.

In addition, the capacity planner 226 includes a user interface 234 and an ISAPI filter 236. The user interface 234 provides areas wherein a user of the server cluster 200 in general and, more specifically, the capacity planner 222 can enter server parameter values and/or a specified load for which the user wants to see server resource utilization and recommendations. The ISAPI filter 236 is used to collect actual server parameter values from the server cluster 200 while the server cluster 200 is operating. It is noted that the filter need not be an ISAPI filter, but can be any type of filter capable of performing the functions listed herein.

The capacity planner 222 includes a load simulation tool 238 which is used to construct simulation scripts—such as the simulation test program 217—that, when run on the master client 214, simulates, plays or replays a server load scenario using actual operating conditions recorded from the server cluster 200. The use of the load simulation tool 238 is described in further detail below.

The implementations and functions of the components of the server cluster 200 outlined above will become more clear as the discussion progresses with continuing reference to the components of FIG. 2.

The server resources that are discussed herein are: (1) processor utilization (also referred to as CPU utilization), wherein the processor utilization for a given load is expressed as a percentage of total processing power available; (2) memory utilization, expressed as a percentage of total memory available is determined by multiplying the memory required for each request by the number of requests; (3) communication bandwidth utilization, expressed as a percentage of the average throughput per bytes per second in relation to the total communication bandwidth available; and (4) general server utilization, expressed as a ratio between a current service rate (number of requests per second served) and the maximum possible service rate (maximum number of requests the server is capable of serving). The general server utilization is less specific than showing the processor, bandwidth, and memory utilization, but it is useful for viewing resource constraints that do not fall under the other categories.

FIG. 3 shows a screen shot of a user interface 300 for a capacity planning worksheet, wherein the user enters the specified load, for which the user desires to observe the effects on the system of handling such a load. The user is required to manually enter several server parameter values. These server parameter values include: number of servers in the server cluster, available communications bandwidth, server name on which a simulation will be run, client name of the client that will serve as the master test client and execute a simulation script, and the name of the script that will be used to run the simulation.

To begin, the user notifies the server cluster 200 to begin collecting data. The monitors 205, 209, 213 collect data from each server 202, 206, 210. The ISAPI filter 236 collects data for other server parameters, namely for communications-related parameters such as number of incoming requests and average response time.

The server resource utilization calculations require knowledge of the maximum load that the server cluster 200 can, theoretically, handle. The implementation described herein is more accurate in deriving the maximum load than any other method described to date.

To find this maximum load, actual operating parameters are collected from the server cluster 200 through the monitors 205, 209, 213 and the ISAPI filter 236. The data collected is utilized by the load simulation tool 238 to derive a simulation script that enables the simulation test program 217 on the master client 214 to recreate the server resource utilizations that occurred during the operational period.

The simulation is run on only one server, selected by a user via the user interface 300. It is assumed that the primary server 202, and the secondary servers 206, 210 are identical. Once the simulation data is derived on one server, the final figures are extrapolated for the total amount of servers in the server cluster. This provides the user with the server resource utilization figures.

Although not particularly discussed herein, it is noted that if the servers are not identical, the simulation script can be run on each individual server and then the individual results can be summed to provide the final totals. For discussion purposes, it is assumed that servers 202, 206, 210 are identical.

Once a script has been obtained, the user is provided with means to increase the test load on the server to run the script. All the other parameters are the same, so increasing the load will, necessarily, increase the utilization of the server resources.

Figure 4:
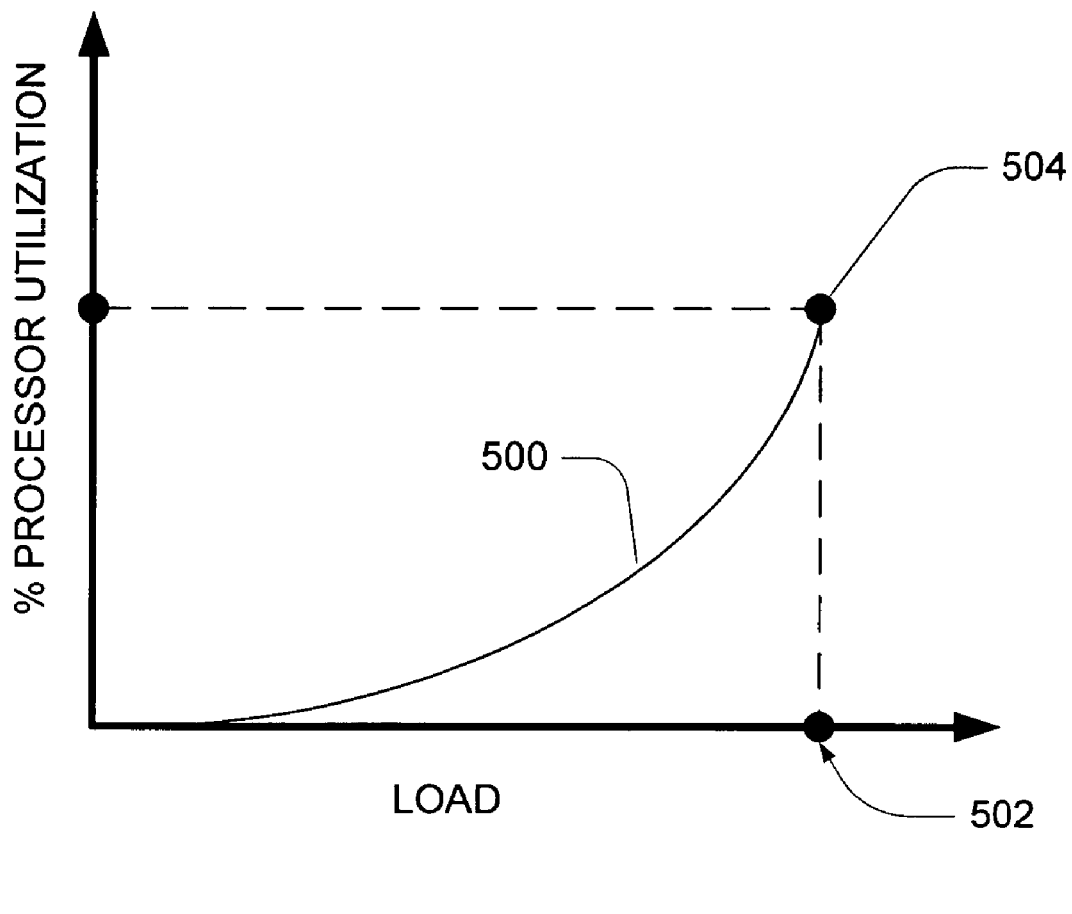
FIG. 4 is a graph of load vs. processor utilization for a calibrated method of capacity planning.

FIG. 4 shows a graph of a load vs. utilization curve 500. For this example, processor utilization is used, though it will be apparent that a similar graph could be constructed for any of the server resource utilization estimates. As the load increases to point 502 on the load axis, the utilization curve 500 reaches a point 504 which can be considered to be the maximum load that can be handled by the server 202.

The user is may increase the load via the user interface 300, and re-run the script using the higher load value. A situation will arise in which an increase in the load will not result in an increase of the rate at which the load is handled. This is the maximum load 502 which the server can handle. The load (L) at this point is used in the resource utilization estimate calculations below.

General server utilization is derived by solving:

$$U = \frac{L}{X}$$

wherein:
U=general server utilization;
L=specified load; and
X=maximum load that can be handled by the server cluster 200.

Processor utilization is derived by solving:

$$U_{CPU} = \frac{a}{e^{b \cdot L}}$$

wherein:
$U_{CPU}$ is processor utilization;
L is the specified load; and
a and b are processor regression constants derived from applying linear regression methodology to several load/utilization (x,y) pairs measured during the test.

Communications bandwidth utilization is derived by solving:

$$U_B = \frac{F_{TCP}}{B} \cdot (c + d \cdot L)$$

wherein:
$U_B$ is communication bandwidth utilization;
$F_{TCP}$ is a transmission overhead factor that, when applied to a certain size page, results in the actual bandwidth necessary to transmit the page;
L is the specified load;
B is the total communication bandwidth available; and
c and d are bandwidth regression constants derived from applying linear regression methodology to several load/utilization (x,y) pairs measured during the test.

The memory utilization is derived by first solving the following equation to determine the number of concurrent connections:

$$N = \frac{L}{(X - L)} + S1 \cdot L$$

wherein:
N is the number of concurrent connections;
L is the specified load;
X is the maximum load that can be handled by the server cluster 200; and
S1 is a connection memory factor that is the adjusted average of the incoming connections at different speeds. For example, suppose that the ISAPI filter 236 has measured the following percentages for connection types:
56K: 50%
ADSL: 20% *question: what relation to screen shot? ISDN?*
T1: 20%
T3: 10%.
Then S1 is the adjusted average of these connection speeds:
56K: 0.5*5.6=2.8 KBytes/sec+
ADSL: 0.2*30=6 KBytes/sec+
T1: 0.2*150=30 KBytes/sec+
T3 0.1*4500=450 KBytes/sec=488.8 KBytes/sec.
Then S1=488.8 KBytes/second.
The memory utilization is thus derived by solving:

$$U_M = \frac{N \cdot (M_{TCP} + M_{IISStruct}) + M_{OS} + M_{IIS}}{M}$$

wherein:
$U_M$ is memory utilization;
N is the number of concurrent connections;

$M_{TCP}$ is an amount of memory for TCP buffers (32 KB per connection);

$M_{IIS}$ is the amount of memory required by a server communication program (50 MB for IIS);

$M_{IISStruct}$ is the amount of memory necessary to support communications program data structures associated with each connection (50 KB per connection for IIS);

$M_{OS}$ is the amount of memory required by a server operating system (64 MB for Windows® NT by the Microsoft Corporation of Redmond, Wash.) and M is the amount of total memory available.

It is noted that some figures have been used that are specific to IIS, the communications program 224 used for purposes of this discussion. However, it is noted that these numbers may be different for different communications programs.

CONCLUSION

The described implementations advantageously provide for capacity planning for a server-client system and, particularly, to a server cluster within a server-client system. The load simulation tool is an extremely accurate tool for determining the maximum load handled by a server. The maximum load can then be substituted into the server resource estimate equations to give accurate server resource utilization results.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for deriving server resource utilization estimates for a server cluster, the method comprising:
    using a load simulation tool to use data recorded during operation of the server cluster, wherein at least some of the data from the server cluster indicates server resource parameter values and at least some of the data is used to simulate load and determine a maximum load that can be handled by the server cluster;
    specifying a load to be handled by the server cluster;
    deriving server resource utilization estimates corresponding to the specified load;
    displaying the server resource utilization estimates;
    recommending a plan to optimize processing of the specified load; and
    changing a configuration of the server cluster in response to the load simulation tool.

2. The method as recited in claim 1, wherein the plan recommends a change in the hardware configuration of the server cluster.

3. The method as recited in claim 1, wherein the maximum load, the recorded values, the specified load, and the server resource utilization estimates are stored in non-volatile memory.

4. A method for deriving server resource utilization estimates for a server cluster, the method comprising:
    using a load simulation tool to use data recorded during operation of the server cluster, wherein at least some of the data from the server cluster indicates server resource parameter values and at least some of the data is used to simulate load and determine a maximum load that can be handled by the server cluster;
    specifying a load to be handled by the server cluster;
    deriving server resource utilization estimates corresponding to the specified load;
    changing a configuration of the server cluster in response to the load simulation tool;
    creating a test script from the recorded values;
    running the test script on a master client to simulate load and server resource utilization conditions that existed on a server when the recorded values were recorded; and
    increasing the load on the server, when the test script is running, until a maximum load that can be handled by the server is obtained;
    wherein the increasing the load on the server until the maximum load that can be handled by the server is obtained, comprises:
        observing a service rate exhibited by the server on which the simulation is being performed; and
        recognizing that the maximum load has been obtained when an increase in the load does not increase the service rate.

5. The method as recited in claim 4, wherein the increasing the load on the server further comprises multiplying the number of users utilizing the server cluster when the recorded values were recorded, thereby multiplying the resources utilized by the users.

6. The method as recited in claim 4, wherein the increasing the load on the server further comprises decreasing the amount of time between user requests, thereby increasing the resources utilized by the users.

7. A method for deriving server resource utilization estimates for a server cluster, the method comprising:
    using a load simulation tool to use data recorded during operation of the server cluster, wherein at least some of the data from the server cluster indicates server resource parameter values and at least some of the data is used to simulate load and determine a maximum load that can be handled by the server cluster;
    specifying a load to be handled by the server cluster;
    deriving server resource utilization estimates corresponding to the specified load;
    changing a configuration of the server cluster in response to the load simulation tool;
    creating a test script from the recorded values;
    running the test script on a master client to simulate load and server resource utilization conditions that existed on a server when the recorded values were recorded; and
    increasing the load on the server, when the test script is running, until a maximum load that can be handled by the server is obtained;
    wherein:
        the server cluster contains a set of identical servers;
        running the test script run on the master client simulates server cluster operation on only one of the servers of the server cluster; and
        the method further comprises extrapolating the results obtained on the one server using the number of servers in the set of identical servers to obtain the maximum load that can be handled by the server cluster.

8. A method for deriving server resource utilization estimates for a server cluster, the method comprising:
    using a load simulation tool to use data recorded during operation of the server cluster, wherein at least some of the data from the server cluster indicates server resource parameter values and at least some of the data is used to simulate load and determine a maximum load that can be handled by the server cluster;
    specifying a load to be handled by the server cluster;

deriving server resource utilization estimates corresponding to the specified load;
changing a configuration of the server cluster in response to the load simulation tool;
creating a test script from the recorded values;
running the test script on a master client to simulate load and server resource utilization conditions that existed on a server when the recorded values were recorded; and
increasing the load on the server, when the test script is running, until a maximum load that can be handled by the server is obtained;
wherein:
the server cluster contains a set of non-identical servers;
running the test script run on the master client further comprises running the test script on each of the non-identical servers in the server cluster; and
the method further comprises summing the results obtained from each non-identical server in the cluster to obtain the maximum load that can be handled by the server cluster.

9. The method as recited in claim 1, wherein the recording server cluster data during operation of the server cluster comprises recording data directly from the server cluster and recording data that is input by a server cluster user.

10. The method as recited in claim 1, wherein the server resource utilization estimates comprise estimates for one or more of the following: processor utilization, memory utilization, communication bandwidth utilization, and general server utilization.

11. The method as recited in claim 1, wherein the server resource utilization comprises general server utilization, the method further comprising:
deriving general server utilization by solving:

$$U = \frac{L}{X}$$

wherein U is the general server utilization; X is the maximum load that can be handled by the server cluster; and L is the specified load.

12. The method as recited in claim 1, wherein the server resource utilization comprises processor utilization, the method further comprising:
deriving processor utilization by solving:

$$U_{CPU} = \frac{a}{e^{b \cdot L}}$$

wherein $U_{CPU}$ is processor utilization; L is the specified load; a is processor regression constant a; and b is processor regression constant b.

13. The method as recited in claim 1, wherein the server resource utilization comprises communication bandwidth utilization, the method further comprising:
deriving communication bandwidth utilization by solving:

$$U_B = \frac{F_{TCP}}{B} \cdot (c + d \cdot L)$$

wherein $U_B$ is communication bandwidth utilization; L is the specified load; c is processor regression constant c; d is processor regression constant d; $F_{TCP}$ is a transmission overhead factor; and B is the total communication bandwidth available.

14. The method as recited in claim 1, wherein the server resource utilization comprises memory utilization, the method further comprising:
deriving memory utilization by solving:

$$U_M = \frac{N \cdot (M_{TCP} + M_{IISStruct}) + M_{OS} + M_{IIS}}{M}$$

wherein N is a total number of concurrent connections derived by solving:

$$N = \frac{L}{(X - L)} + S1 \cdot L$$

wherein: $U_M$ is memory utilization; $M_{TCP}$ is a an amount of memory necessary to support the connections for communications; $M_{IISStruct}$ is the amount of memory necessary to support data structures associated with each connection; $M_{OS}$ is the amount of memory required by a server operating system; $M_{IIS}$ is the amount of memory required by a server communication program; M is the total amount of memory available; L is the specified load; X is the maximum load that can be handled by the server cluster; and S1 is a connection memory factor tat is the adjusted average of the incoming connections at different speeds.

15. The method as recited in claim 1, wherein the server resource utilization comprises processor utilization, the method further comprising:
deriving processor utilization by solving:

$$U_{CPU} = \frac{a}{e^{b \cdot L}}$$

wherein $U_{CPU}$ is processor utilization; L is the specified load; a is processor regression constant a; and b is processor regression constant b.

16. The method as recited in claim 1, wherein the server resource utilization comprises communication bandwidth utilization, the method further comprising:
deriving communication bandwidth utilization by solving:

$$U_B = \frac{F_{TCP}}{B} \cdot (c + d \cdot L)$$

wherein $U_B$ is communication bandwidth utilization; L is the specified load; c is processor regression constant c; d is processor regression constant d; $F_{TCP}$ is a transmission overhead factor; and B is the total communication bandwidth available.

17. The method as recited in claim 1, wherein the server resource utilization comprises memory utilization, the method further comprising:
deriving memory utilization by solving:

$$U_M = \frac{N \cdot (M_{TCP} + M_{IISStruct}) + M_{OS} + M_{IIS}}{M}$$

wherein N is a total number of concurrent connections derived by solving:

$$N = \frac{L}{(X - L)} + S1 \cdot L$$

wherein: $U_M$ is memory utilization; $M_{TCP}$ is a an amount of memory necessary to support the connections for communications; $M_{IISStruct}$ is the amount of memory necessary to support data structures associated with each connection; $M_{OS}$ is the amount of memory required by a server operating system; $M_{IIS}$ is the amount of memory required by a server communication program; M is the total amount of memory available; L is the specified load; X is the maximum load that can be handled by the server cluster; and S1 is a connection memory factor that is the adjusted average of the incoming connections at different speeds.

18. The method recited in claim 1, wherein the server resource utilization is processor utilization, the method further comprising:
   finding a functional dependency approximation between processor utilization and load;
   transforming functional dependency into linear form by using logarithmic transformation;
   deriving first and second processor regression constants using linear regression methodology;
   dividing the first processor regression constant by e to the power of the product of the second processor regression constant and the specified load to obtain the processor utilization estimate.

19. The method as recited in claim 1, wherein the server resource utilization is communication bandwidth utilization, the method further comprising:
   finding a functional dependency approximation between communication is bandwidth utilization;
   transforming functional dependency into linear form by using logarithmic transformation;
   deriving first and second bandwidth regression constants using linear regression methodology;
   deriving a transmission overhead factor that, when applied to a certain size web page, results in the actual capacity necessary to transmit the web page;
   deriving a weighted communication overhead factor by dividing the transmission overhead factor by the available communication bandwidth;
   deriving an adjusted communication load by adding the first bandwidth regression constant to the product of the specified load and the second bandwidth regression constant; and
   determining the communication bandwidth utilization estimate by multiplying the weighted communication overhead factor by the adjusted communication load.

20. The method as recited in claim 1, wherein the server resource utilization is memory utilization, the method further comprising:
   deriving a connection memory factor that is the adjusted average of the incoming connections at different speeds;
   deriving a weighted connection memory factor by multiplying the connection memory factor by the specified load;
   deriving a page load ratio by dividing the specified load by the difference of the maximum load value and the specified load;
   deriving a total number of concurrent connections by adding the weighted connection memory factor and the page load ratio; and
   deriving a gross memory utilization by multiplying the total number of concurrent connections by the sum of the amount of memory necessary to support each connection for communications and the amount of memory necessary to support data structures associated with each connection, and adding the amount of memory required by a server operating system and the amount of memory required by the server communication program; and
   deriving the memory utilization estimate by dividing the gross memory utilization by total memory available.

21. A method for deriving server resource utilization estimates for a server cluster, the method comprising:
   using a load simulation tool to use data recorded during operation of the server cluster, wherein at least some of the data from the server cluster indicates server resource parameter values and at least some of the data is used to simulate load and determine a maximum load that can be handled by the server cluster;
   specifying a load to be handled by the server cluster;
   deriving server resource utilization, estimates corresponding to the specified load, wherein the server resource utilization is general server utilization;
   dividing the specified load by the maximum load to derive the general server utilization estimate; and
   changing a configuration of the server cluster in response to the load simulation tool.

22. One or more computer-readable media having computer-readable instructions thereon which, when executed by one or more computers, cause the computers to implement the method of claim 1, whereby the change to the configuration of the server cluster is made.

23. A simulation tool for use in determining server resource utilization estimates in a server cluster having one or more servers, the load simulation tool comprising:
   a user interface;
   to at least one filter or monitor configured to record operational data from one or more of the servers in the server cluster;
   the simulation tool being configured to create a test script from the recorded operational data and data received from a user, and to run the test script from a master client connected to the server cluster to simulate load and other server conditions that existed when the operational data was recorded; and
   the user interface being configured to display utilization of server resources during the running of the test script;
   wherein the user interface is configured to receive data input from the user, the simulation tool being configured to create the test script being further configured to allow the user to create the test script to increase the load on the server on which the simulation is running and observe the effect of such an increase in load on the server resource utilization displays.

24. A system, comprising:
   a server cluster having one or more servers, one of which is a primary server that controls the operation of the server cluster;
   a cluster controller resident in memory on the primary server of the server cluster, the duster controller controlling communications between the primary server and secondary servers, if any, and between clients and the server duster;
   a communications program within the cluster controller to provide communications capability for the system;
   a filter to collect server data indicating certain operating parameters for the server cluster;
   a monitor on each server in the server, cluster to collect server data indicating certain operating parameters for the server cluster;
   is a user interface to collect data input by a user;
   a capacity planner within the cluster controller configured to utilize the collected data to derive one or more server resource utilization estimates for server resources to determine how handling a specified load will affect the utilization of the server resources, and to produce a plan recommending changes to be made to the server cluster to adequately accommodate the specified load; and a load simulation tool configured to use the collected data to create a simulation script that, when run on a master client, simulates the operation of the server cluster system to allow the user to find the maximum load that the server cluster can handle; and wherein the maximum load obtained through the use of the load simulation tool is utilized in the derivation of the one or more server resource utilization estimates and wherein a configuration of the server cluster is changed in response to the use of the load simulation tool.

25. The system as recited in claim 24, wherein the filter is an ISAPI filter.

26. The system as recited in claim 21, wherein the collected data and the plans are stored in the memory.

27. The system as recited in claim 24, wherein the simulation script is run from a master client connected to the server cluster, and wherein the simulation is performed on only one server of the server cluster.

28. The system as recited in claim 27, wherein the load simulation tool is further configured to extrapolate results from the simulation on one server in the server cluster to derive results for the total number of servers in the server cluster.

29. The system as recited in claim 24, wherein:
the load simulation tool is further configured to run a simulation script from a master client connected to the server cluster;
the simulation is performed on each server in the server cluster; and
results from each server are summed to derive results of the total number of servers in the server cluster.

30. The system as recited in claim 24, wherein the server resource utilization derived by the capacity planner comprises general server utilization, and the capacity planner is further configured to derive general server utilization by solving:

$$U = \frac{L}{X}$$

wherein U is the general server utilization; X is the maximum load that can be handled by the server cluster which is determined by the load simulation tool; and L is the specified load.

31. The system as recited in claim 24, wherein the server resource utilization derived by the capacity planner comprises general server utilization, and the capacity planner is further configured to derive general server utilization by solving:

$$U_{CPU} = \frac{a}{e^{b \cdot L}}$$

wherein $U_{CPU}$ is processor utilization; L is the specified load; a is processor regression constant a; and b is processor regression constant b.

32. The system as recited in claim 24, wherein the server resource utilization derived by the capacity planner comprises communication bandwidth utilization, and the capacity planner is further configured to derive communication bandwidth utilization by solving:

$$U_B = \frac{F_{TCP}}{B} \cdot (c + d \cdot L)$$

wherein $U_B$ is communication bandwidth utilization; L is the specified load; c is processor regression constant c; d is processor regression constant d; $F_{TCP}$ is a transmission overhead factor; and B is the total communication bandwidth available.

33. The system as recited in claim 24, wherein the server resource utilization derived by the capacity planner comprises communication bandwidth utilization, and the capacity planner is further configured to derive communication bandwidth utilization by solving:

$$U_M = \frac{N \cdot (M_{TCP} + M_{IISStruct}) + M_{OS} + M_{IIS}}{M}$$

wherein N is a total number of concurrent connections derived by solving:

$$N = \frac{L}{(X - L)} + S1 \cdot L$$

wherein: $U_M$ is memory utilization; $M_{TCP}$ is a an amount of memory necessary to support the connections for communications; $M_{IISStruct}$ is the amount of memory necessary to support data structures associated with each connection; $M_{OS}$ is the amount of memory required by a server operating system; $M_{IIS}$ is the amount of memory required by a server communication program; M is the total amount of memory available; L is the specified load; X is the maximum load that can be handled by the server cluster; and S1 is a connection memory factor that is the adjusted average of the incoming connections at different speeds.

34. One or more computer-readable media having computer-readable instructions thereon which, when executed by one or more computers, cause the computers to derive server resource utilization estimates for a server cluster having at least one primary server and at least one secondary server coupled to the primary server, the media further including instructions to cause the computers to:
use a load simulation tool that, using recorded server cluster operations data, at least some of which data is indicative of server resource parameter values, determines a maximum load that can be handled by the server cluster;
specify a load to be handled by the server cluster;
derive server resource utilization estimates corresponding to the specified load;
recommend a plan to optimize processing of the specified load; and
display the plan to a user through a user interface.

35. The computer-readable media as recited in claim 34, wherein displaying the plan comprises further instructions to cause the computers to display the server resource utilization estimates.

36. The computer-readable media as recited in claim 34, further comprising instructions to cause the computers to recommend a change in the hardware configuration of the server cluster to optimize processing of the specified load.

37. The computer-readable media as recited in claim 34, further comprising instructions to cause the computers to store data comprising the maximum load, the recorded values, the specified load, and the server resource utilization estimates in non-volatile memory.

* * * * *